United States Patent
Chauhan et al.

(10) Patent No.: US 12,271,293 B1
(45) Date of Patent: Apr. 8, 2025

(54) PARALLEL SOFTWARE TESTING BASED ON ANNOTATIONS

(71) Applicant: State Farm Mutual Automobile Insurance Company, Bloomington, IL (US)

(72) Inventors: Shaktiraj Chauhan, Normal, IL (US); Nate Shepherd, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 43 days.

(21) Appl. No.: 17/333,894

(22) Filed: May 28, 2021

Related U.S. Application Data

(60) Provisional application No. 63/152,771, filed on Feb. 23, 2021.

(51) Int. Cl.
G06F 11/36 (2006.01)
G06F 8/73 (2018.01)
G06F 11/3668 (2025.01)
G06N 20/00 (2019.01)

(52) U.S. Cl.
CPC ........... G06F 11/3688 (2013.01); G06F 8/73 (2013.01); G06F 11/3664 (2013.01); G06F 11/3692 (2013.01); G06N 20/00 (2019.01)

(58) Field of Classification Search
CPC ............. G06F 11/3688; G06F 11/3664; G06F 11/3692; G06F 8/73; G06N 20/00
See application file for complete search history.

(56) References Cited

U.S. PATENT DOCUMENTS

| | | | |
|---|---|---|---|
| 6,330,528 B1 | 12/2001 | Huang et al. | |
| 7,178,063 B1 | 2/2007 | Smith | |
| 7,506,312 B1 | 3/2009 | Girolami-Rose et al. | |
| 8,028,276 B1* | 9/2011 | Bessonov | G06F 11/3684 717/124 |
| 8,281,187 B1 | 10/2012 | Desai et al. | |
| 8,549,522 B1 | 10/2013 | Chatterjee et al. | |
| 8,639,983 B1* | 1/2014 | Desai | G06F 11/26 709/219 |
| 9,009,823 B1 | 4/2015 | Ismael et al. | |
| 9,032,373 B1 | 5/2015 | Gupta et al. | |
| 10,067,858 B2 | 9/2018 | McDonald | |

(Continued)

OTHER PUBLICATIONS

DiGiuseppe, Nicholas. "Automatically describing software faults." Proceedings of the 2013 9th Joint Meeting on Foundations of Software Engineering. 2013. (Year: 2013).*

Qusef, Abdallah, et al. "Recovering test-to-code traceability using slicing and textual analysis." Journal of Systems and Software 88 (2014): 147-168. (Year: 2014).*

Rauf, Abdul, et al. "Ontology driven semantic annotation based GUI testing." 2010 6th International Conference on Emerging Technologies (ICET). IEEE, 2010. (Year: 2010).*

(Continued)

*Primary Examiner* — Bradley A Teets
*Assistant Examiner* — Joanne G Macasiano
(74) *Attorney, Agent, or Firm* — Lee & Hayes, P.C.

(57) ABSTRACT

Annotations associated with test cases written to test a software application can allow related test cases to be dynamically distributed among different sets of test cases that can be executed simultaneously in different parallel threads, thereby speeding up testing relative to executing the test cases sequentially in a single thread. The annotations can also allow test cases to be identified that are relevant to code changes, such that testing times can be further reduced by executing a subset of test cases relevant to code changes instead of a full set of test cases.

20 Claims, 5 Drawing Sheets

(56) References Cited

U.S. PATENT DOCUMENTS

| | | | |
|---|---|---|---|
| 10,387,295 | B1 | 8/2019 | Kesarwani |
| 10,430,319 | B1 | 10/2019 | Tokappa et al. |
| 10,628,394 | B1 | 4/2020 | Gurspan |
| 11,080,171 | B2* | 8/2021 | Venkataraman .... G06F 11/3688 |
| 11,537,575 | B1 | 12/2022 | McNair et al. |
| 11,537,616 | B1 | 12/2022 | Lin |
| 2002/0116507 | A1 | 8/2002 | Manjure et al. |
| 2003/0208351 | A1 | 11/2003 | Hartman et al. |
| 2005/0120276 | A1 | 6/2005 | Kolawa |
| 2005/0251719 | A1 | 11/2005 | Gerber |
| 2006/0212412 | A1 | 9/2006 | Sapir |
| 2007/0226691 | A1* | 9/2007 | Happell ................ G06F 11/368 717/124 |
| 2007/0271483 | A1 | 11/2007 | Kolawa et al. |
| 2009/0144706 | A1 | 6/2009 | Pastorelli |
| 2009/0187366 | A1 | 7/2009 | Day et al. |
| 2009/0259699 | A1 | 10/2009 | Chasman et al. |
| 2009/0307763 | A1 | 12/2009 | Rawlins et al. |
| 2010/0100871 | A1 | 4/2010 | Celeskey |
| 2011/0246540 | A1* | 10/2011 | Salman ............... G06F 16/2379 707/812 |
| 2012/0023373 | A1 | 1/2012 | Chen |
| 2012/0151455 | A1* | 6/2012 | Tsantilis ............. G06F 11/3688 717/132 |
| 2013/0047141 | A1 | 2/2013 | Shann et al. |
| 2014/0359581 | A1* | 12/2014 | Soshin ................ G06F 11/3688 717/126 |
| 2016/0026562 | A1 | 1/2016 | Hwang et al. |
| 2016/0041543 | A1 | 2/2016 | Monczynski et al. |
| 2016/0162392 | A1 | 6/2016 | Hu et al. |
| 2016/0246575 | A1 | 8/2016 | Baluch et al. |
| 2017/0109257 | A1 | 4/2017 | Li |
| 2018/0113798 | A1* | 4/2018 | Johnston ............. G06F 11/3612 |
| 2018/0113799 | A1* | 4/2018 | M.V. .................. G06F 11/3688 |
| 2018/0121339 | A1 | 5/2018 | Mayers et al. |
| 2018/0173606 | A1 | 6/2018 | Malla et al. |
| 2019/0087311 | A1 | 3/2019 | Donaldson et al. |
| 2019/0129833 | A1* | 5/2019 | Lv ....................... G06F 11/3664 |
| 2019/0332523 | A1 | 10/2019 | Gefen et al. |
| 2020/0065235 | A1 | 2/2020 | Li |
| 2020/0125485 | A1 | 4/2020 | Wiener et al. |
| 2020/0174907 | A1* | 6/2020 | Lundquist ................ G06F 8/71 |
| 2020/0210170 | A1 | 7/2020 | Johnson |
| 2020/0310860 | A1 | 10/2020 | Arumugam et al. |
| 2020/0349062 | A1 | 11/2020 | Coleman et al. |
| 2021/0109848 | A1 | 4/2021 | Leon |
| 2021/0174228 | A1* | 6/2021 | Gokarn .................. G06F 16/58 |
| 2021/0286710 | A1 | 9/2021 | Hicks et al. |
| 2021/0288925 | A1* | 9/2021 | Tagra ..................... H04L 51/04 |
| 2023/0090033 | A1 | 3/2023 | Chauhan |
| 2023/0333972 | A1 | 10/2023 | Shaktiraj |
| 2023/0333973 | A1 | 10/2023 | Shaktiraj |

OTHER PUBLICATIONS

Shrivathsan, A. D., et al. "Novel fuzzy clustering methods for test case prioritization in software projects." Symmetry 11.11 (2019): 1400. (Year: 2019).*

Mei, Lijun, et al. "Tag-based techniques for black-box test case prioritization for service testing." 2009 Ninth International Conference on Quality Software. IEEE, 2009. (Year: 2009).*

Willemsen, M. J. Improving diagnosis by Grouping Test Cases to Reduce Complexity. MS thesis. University of Twente, 2018. (Year: 2018).*

Office Action for U.S. Appl. No. 17/333,989, mailed on Nov. 18, 2022, Chauhan, "Test Conflict Guard for Parallel Software Testing", 33 Pages.

Office Action for U.S. Appl. No. 17/333,637, mailed on Jun. 15, 2022, Chauhan "Retrying Failed Test Cases in Software Testing Using Parallel Threads", 18 pages.

Office Action for U.S. Appl. No. 17/333,535, mailed on Jun. 20, 2022, Chauhan, "Software Testing in Parallel Threads With a Record-Locking Database", 6 pages.

Office Action for U.S. Appl. No. 17/333,739, mailed Aug. 4, 2022, Chauhan, "Software Testing in Parallel With Different Database Instances", 12 pages.

Haftmann, et al., "Parellel Execution of Test Runs for Database Application Systems" Proceedings of the 31st VLDB Conference, 2005, 12 pgs.

Office Action for U.S. Appl. No. 17/333,739, mailed on Jan. 12, 2023, Chauhan, "Software Testing in Parallel With Different Database Instances", 12 pages.

Office Action for U.S. Appl. No. 17/333,637, mailed on Dec. 20, 2022, Chauhan, "Retrying Failed Test Cases in Software Testing Using Parallel Threads", 22 Pages.

Office Action for U.S. Appl. No. 17/333,989, mailed on Apr. 4, 2023, Chauhan, "Test Conflict Guard for Parallel Software Testing", 37 Pages.

Office Action for U.S. Appl. 18/070,120, mailed on Jun. 16, 2023, Chauhan, "Software Testing in Parallel Threads With a Record-Locking Database", 7 Pages.

Office Action for U.S. Appl. No. 18/482,772, mailed on May 22, 2024, Chauhan, "Test Conflict Guard for Parallel Software Testing", 30 pages.

Office Action for U.S. Appl. No. 18/070,120, mailed on Jun. 16, 2023, Chauhan, "Software Testing in Parallel Threads With a Record-Locking Database", 7 Pages.

Office Action for U.S. Appl. No. 18/482,772, dated Sep. 10, 2024, 32 pages.

Office Action for U.S. Appl. No. 18/336,757, Dated Jun. 20, 2024, 28 pages.

Office Action for U.S. Appl. No. 18/334,786, Dated Jul. 16, 2024, 6 pages.

* cited by examiner

PARALLEL SOFTWARE TESTING BASED ON ANNOTATIONS

RELATED APPLICATIONS

This U.S. Patent application claims priority to provisional U.S. Patent Application No. 63/152,771, entitled "PARALLEL SOFTWARE TESTING BASED ON ANNOTATIONS," filed on Feb. 23, 2021, the entirety of which is incorporated herein by reference.

TECHNICAL FIELD

The present disclosure relates to software development, particularly with respect to performing unit and integration testing by executing groups test cases in parallel based on annotations.

BACKGROUND

During development of a software application, software developers can prepare tests to verify that the software application operates as expected. Such tests may be associated with unit testing that evaluates the functionality of a relatively small piece of code, and/or integration testing that evaluates how multiple pieces of code interact. Because individual tests may be designed to test one or more relatively small aspects of the overall software application, software developers may create numerous tests associated with the entire software application.

Some tests associated with the software application may build on one another. For instance, a first test may create a record in a database, and a second test may be designed to further access or edit the database record created by the first test. In this situation, a developer may write code for the second test under the assumption that the first test will already have executed and created the record in the database by the time the second test executes. Accordingly, in this situation, the second test may be dependent on data created by the first test.

In some situations, when a new version of the software application is tested, it can take a relatively long period of time to execute all of the tests and verify that the new version of the software application successfully passes all of the tests. For instance, tests can be written to build on each other in a sequential order as discussed above, and running a large set of tests in a sequence can take a relatively long period of time. As a non-limiting example, tests for a software application may be written in a set of 7000 class files that each include numerous functions, and it may take up to two hours to sequentially execute all of the tests in the 7000 class files.

The time it takes to sequentially execute a large set of tests can pose challenges and introduce delays during software development, particularly in situations in which multiple developers are working on the same software application. As an example, a team of software developers may generate sixty new builds of the software application in a single day. If each build is tested using a set of 7000 class files that takes up to 120 minutes of server time to execute, the testing may take up to 7200 minutes of server time in a single day.

As another example, two developers may check out code from a main code branch and independently make changes to the code for the software application. If the first developer submits updated code for testing, it may take two hours to run a set of test cases on the first developer's updated code. However, by the time the testing verifies that the first developer's changes have passed the set of test cases and can be incorporated back into the main code branch, the second developer may separately have submitted different code changes for testing. The code changes made by the second developer may be incompatible with the changes made by the first developer. Accordingly, even if the second developer's changes also independently pass the set of test cases, it may not be possible to incorporate those changes back into the main code branch due to incompatible changes already made by the first developer. If testing of the first developer's code changes had been performed more quickly, the second developer could have been made aware of the first developer's changes and accounted for them before the second developer submitted additional code changes for testing.

Accordingly, it can be desirable to execute tests on updated code for a software application more quickly than described above. One possibility for speeding up the testing process is to run different tests in parallel at the same time. For example, rather than running tests within a set of 7000 class files in sequence, the tests can be divided into smaller sets that can be run simultaneously in two or more parallel threads. Although executing the set of tests in sequence may take up to two hours, running different subsets of the tests simultaneously in parallel threads may allow the set of tests to complete in 30 minutes or less. Developers can thus be notified whether their code changes pass the set of tests more quickly, and allow code changes that have passed the set of tests to be merged into a main code branch more quickly. In addition to executing tests more quickly for a single new build of a software application, running tests in parallel threads can also reduce overall usage of server time when multiple new builds of the software application are tested. For instance, if testing each build of a software application takes up to 120 minutes when tests are executed sequentially in a single thread, it can take up to 7200 minutes of server time to test sixty different builds in a day. If running the tests in parallel reduces the testing time for each build down to 30 minutes as discussed above, testing sixty builds in a day may instead take only 1800 minutes of server time. However, although parallelization can speed up testing of a software application, in some cases the parallelization itself can cause errors and/or failed tests during testing.

For example, as discussed above, tests may be written under the assumption that the tests will build on one another in a sequential order. Code changes may pass such tests if the tests are indeed executed sequentially in the originally-intended order. However, the same code changes may not pass the same tests if the tests are executed out of order, for instance if related or dependent tests are executed out of order in different parallel threads.

As an example, multiple tests may attempt to access the same table of a database. The database may be configured to at least briefly lock the table when the table is accessed by a code element, such that the database table cannot be changed by other code elements while the table is locked. If a set of tests are run sequentially in an intended order, a first test may have finished accessing a database table, and the table can thus be unlocked, by the time a second test later attempts to access the database table. The second test may succeed in this scenario due to the unlocked database table. However, if the tests are instead run in parallel as described above, there is a chance that different tests, executing simultaneously in different parallel threads, may attempt to access the same database table at essentially the same time. This can cause database conflicts, table locking errors, and/or failure of one or more of the tests. For instance, if a database table is locked due to a first test accessing the database table, the table may still be locked if a second test, executing in parallel with the first test, also attempts to access the database table. The database table locking can thus cause the second test to fail, even though the second test may have succeeded if it had been executed at a different time when the database table was not locked due to another test executing in parallel.

As another example, tests may be written such that a first test creates data in a database, and a second test accesses or edits the data that the first test created. If these two tests are executed in sequence, the first test can have successfully created the data in the database by the time the second test attempts to access that data in the database. However, if the tests are instead run in parallel, there is a chance that the second test will execute in a parallel thread earlier than the first test executes in another parallel thread. Accordingly, if the second test executes earlier than the first test due to parallelization, the second test may fail because database data used in the second test has not yet been created by the first test.

Additionally, in some cases it may be inefficient to execute a full set of tests after code for test cases and/or the software application has been changed. For instance, if only a small portion of code has changed, many of the tests associated with a full set of 7000 class files may not be relevant to the code changes. Accordingly, it can be inefficient to execute the full set of tests in 7000 class files. However, in many systems it can be difficult to identify which tests are relevant to the code changes and thus should be executed, and/or which tests are not relevant to the code changes and can be skipped during testing.

The example systems and methods described herein may be directed toward mitigating or overcoming one or more of the deficiencies described above.

SUMMARY

Described herein are systems and methods for testing a software application using a set of test cases distributed among in parallel threads. In particular, a test manager can determine annotations associated with individual test cases that identify test topics associated with the test cases, and can use the annotations to divide the set of test cases into groups of related test cases. The test manager can assign groups of related test cases among different test sets associated with different parallel threads. The different test sets can execute in parallel, however database errors can be avoided because related test cases can be executed in the same test set in association with the same parallel thread. Executing such test cases in parallel, instead of in sequence, can reduce testing times and reduce usages of computing resources. In some examples, the test manager can also use the annotations to identify a subset of test cases that are relevant to code changes, and distribute just that subset of relevant test cases among parallel threads. Executing a smaller subset of relevant test cases, instead of the full set of test cases, can further reduce testing times and reduce usages of computing resources.

According to a first aspect, a computer-implemented method can include identifying, by one or more processors of a computing device, a plurality of test cases associated with a software application. A plurality of annotations can be associated with the plurality of test cases to indicate test topics associated with the plurality of test cases. The method can also include determining, by the one or more processors, a code change associated with at least one: a test case of the plurality of test cases, or the software application, and determining, by the one or more processors, an annotation of the plurality of annotations associated with the code change. The method can further include identifying, by the one or more processors, and from among the plurality of test cases, a subset of test cases associated with the annotation. The method can also include dividing, by the one or more processors, the subset of test cases into groups of test cases based on the plurality of annotations. Individual groups of test cases can share at least one common annotation. The method can also include distributing, by the one or more processors, the groups of test cases among a plurality of test sets, and executing, by the one or more processors, the plurality of test sets in parallel.

According to a second aspect, a computing device can include one or more processors and memory storing computer-executable instructions that, when executed by the one or more processors, cause the one or more computing devices to perform operations. The operations can include identifying a plurality of test cases associated with a software application, and identifying a plurality of annotations associated with the plurality of test cases. The plurality of annotations can indicate test topics associated with the plurality of test cases. The operations can also include identifying a first group of test cases associated with a first annotation of the plurality of annotations, and identifying a second group of test cases associated with a second annotation of the plurality of annotations. The operations can further include distributing the first group of test cases to a first test set associated with a first parallel thread, and distributing the second group of test cases to a second test set associated with a second parallel thread. The operations can also include executing the first test set and the second test set in parallel.

According to a third aspect, one or more non-transitory computer-readable media can store computer-executable instructions that, when executed by one or more processors, cause the one or more processors to perform operations. The operations can include identifying a plurality of test cases associated with a software application, and identifying a plurality of annotations associated with the plurality of test cases. The plurality of annotations can indicate test topics associated with the plurality of test cases. The operations can also include determining a code change associated with at least one of: a test case of the plurality of test cases, or the software application, and determining an annotation associated with the code change. The operations can further include identifying, from among the plurality of test cases, a subset of test cases associated with the annotation, identifying, in the subset of test cases, a first group of test cases associated with a first annotation of the plurality of annotations, and identifying, in the subset of test cases, a second group of test cases associated with a second annotation of the plurality of annotations. The operations can also include distributing the first group of test cases to a first test set associated with a first parallel thread, distributing the second group of test cases to a second test set associated with a second parallel thread, and executing the first test set and the second test set in parallel.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
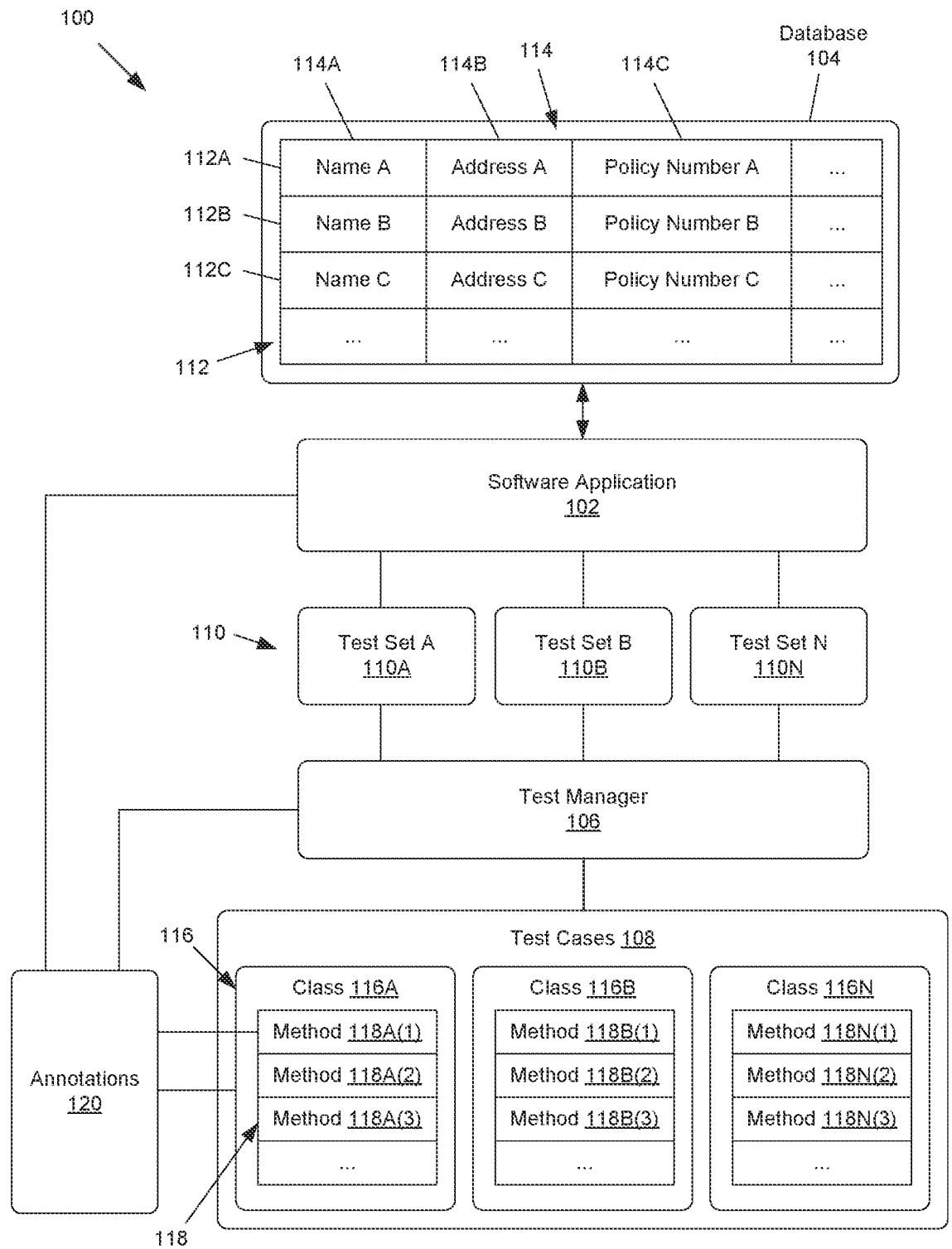
FIG. 1 shows an example of a system for testing a software application that operates in association with a database.

FIG. 1 shows an example of a system 100 for testing a software application 102 that operates in association with a database 104. In particular, the system 100 can include a test manager 106 that distributes code for a set of test cases 108 among different test sets 110 associated with different parallel threads on a computing device. The test manager 106 can cause the test cases 108 in the test sets 110 to execute, substantially simultaneously, in the parallel threads on the computing device in association with one or more instances of the software application 102. Accordingly, executing the test cases 108 in parallel threads can increase the speeds at which the test cases 108 can be executed, relative to executing the test cases 108 in sequence in a single thread. As discussed further below, in some examples the test manager 106 can also identify a specific subset of relevant test cases 108 to execute, and distribute the subset of relevant test cases 108 among the test sets 110 to be executed in parallel.

The software application 102 can be a software program comprising computer-executable instructions associated with one or more functions. As a non-limiting example, the software application 102 can be an insurance policy management system that manages insurance policies by enabling creation, renewal, and/or termination of insurance policies associated with an insurance company, enabling users associated with the insurance company to view and/or edit information about insurance policies, and/or performing other tasks associated with management of insurance policies. In this example, information about insurance policies can be stored in the database 104, such that the software application 102 can access and/or edit information about the insurance policies in the database 104. In other examples, the software application 102 can be a billing and payment system, a customer management system, an order tracking system, an electronic commerce system, a database management system, or any other type of software that operates at least in part based on data stored in the database 104.

The software application 102 can be a compiled and/or executable version of code written in a programming language such as Gosu®, Java®, C++, C#, Python®, or any other programming language. For instance, in examples in which code for the software application 102 is written using Gosu® or Java®, the code can be compiled into an executable and/or deployable file, such as a web application archive (WAR) file or a Java® archive (JAR) file.

Over time, software developers can write new and/or updated code to create new and updated versions of the software application 102. For example, software developers may write new and/or updated code to implement new features of the software application 102, update or enhance existing features of the software application 102, update the software application 102 to communicate with other software applications, or for any other reason. As a non-limiting example, if the software application 102 is the insurance policy management system described above, software developers may write new code to integrate the insurance policy management system with a separate billing system, a separate customer management system, and/or other separate systems or applications.

The database 104 can be a relational database, non-relational database, object-oriented database, network database, hierarchical database, a flat file or other flat structured data storage element, or any other type of database or data storage element that stores records. In some examples, the database 104 may organize data into one or more tables that each have rows and columns. However, in other examples, the database 104 may store data in other formats without the use of tables.

The database 104 can contain any number of records 112A, 112B, 112C, etc. (referred to collectively herein as "records 112") having any number of attributes 114A, 114B, 114C, etc. (referred to collectively herein as "attributes 114"). In some examples, different records 112 can be represented as different rows of a table, while different attributes 114 of the records 112 can be represented as different columns of the table. In other examples, different records 112 can be represented in the database 104 without the use of rows and columns, or tables.

FIG. 1 shows a non-limiting example in which records 112 in the database 104, including a first record 112A, a second record 112B, and a third record 112C, are associated with insurance policies. These example records 112 can each include attributes 114, such a name attribute 114A, an address attribute 114B, a policy number attribute 114C, and/or other types of attributes 114. In other examples, records 112 and their attributes 114 can be associated with any other type of data, such as customer information, order information, billing information, or any other data.

Data in the database 104 can be accessed or changed using a query language, such as the Structured Query Language (SQL), and/or other types of commands or input. For example, the software application 102 may use SQL queries or other commands to add new records 112, edit existing records 112, delete records 112, retrieve one or more attributes 114 of one or more records 112, and/or otherwise interact with the database 104.

In some examples, the software application 102 can be tightly coupled with the database 104. For example, when software application 102 executes, software application 102 can create the database 104 as a tightly coupled database, such that the database 104 can store data used by the software application 102 during execution of the software application 102. In other examples, the software application 102 can be loosely coupled with the database 104. For instance, the database 104 can be initiated and/or maintained separately from the software application 102.

In some examples, the database 104 can be an in-memory database that stores data in random-access memory (RAM) or other volatile memory of a computing device. For instance, the database 104 can be instantiated as an in-memory database when the software application 102 is loaded or instantiated in memory. As an example, when the software application 102 is loaded into memory by a computing device for execution, the software application 102 may create a new instance of the database 104 as an in-memory database by defining one or more columns of one of more tables, or by otherwise instantiating the database 104. Thereafter, the software application 102 can add records 112 to the database 104, or otherwise access the database 104, after in-memory database has been instantiated. For example, records 112 in the database 104 can be accessed based on test cases 108 in one or more test sets 110 that are executed in association with the software application 102 and the database 104, as discussed further below. In other examples, the database 104 can be stored in persistent memory such as hard disk drives, solid-state drives, or other non-volatile memory. In various examples, the database 104 can be an "H2mem" database, a "Postgres" database, or any other type of database.

In some examples, the database 104 can be a table-locking database. A table-locking database can be configured to at least briefly lock a table of the database 104, including all of the records 112 of that table, when any record in the table is accessed. For example, when a first software element accesses a record of a table, the table-locking database may lock the entire table such that other software elements are prevented from accessing or editing any data in the table while the first software element is accessing the table. As a non-limiting example, the database 104 can be an "H2mem" in-memory database with an "MVStore" engine that is configured to at least briefly lock an entire database table when the table is accessed.

In other examples, the database 104 can be a record-locking database. A record-locking database can be configured to at least briefly lock individual records 112 in the database 104 when such records 112 are accessed, instead of locking an entire table, another data structure larger than an individual record, or the entire database 104. As a non-limiting example, the database 104 can be an "H2mem" in-memory database that uses Multi-Version Concurrency Control (MVCC) to set database locks at a record level. In some examples, a record-locking database can permit software elements to simultaneously access different records 112 of the same database. For example, when the database 104 is a record-locking database, different methods 118 of different test sets 110 executing in different parallel threads can access different records 112 in the database 104 simultaneously.

In still other examples, the database 104 can be any other type of database that does or does not use tables. For example, the database 104 may be a non-relational database or flat file that stores records 112 without the use of tables.

Software developers can write code to test the functionality of new or existing versions of the software application 102. For example, one or more software developers can create the set of test cases 108 for unit testing and/or integration testing of the software application 102. In some examples, software developers can use an integrated development environment (IDE), text editor, or other programming environment or tool to write code for test cases 108, as discussed further below with respect to FIG. 2.

The test cases 108 can be designed to verify whether a new or existing version of the software application 102 passes the test cases 108 and operates as intended by the software developers. The test cases 108 can test various scenarios regarding how the software application 102 can interact with the database 104. For instance, the test cases 108 may test whether the software application 102 can access the database 104, can access particular tables of the database 104, and/or can access particular records 112 in the database 104.

In some examples, there may be a relatively large number of test cases 108 in part due to regulatory requirements, state laws, business requirements, rules, and/or other factors. For instance, when the software application 102 is a policy management system that manages insurance policies, different states or jurisdictions may have different laws that impact how such insurance policies are to be managed. Accordingly, the set of test cases 108 can include one set of tests that attempt to verify that the software application 102 can successfully manage insurance policies according to the rules of one jurisdiction, as well as another set of tests that attempt to verify that the software application 102 can also successfully manage insurance policies according to the rules of another jurisdiction.

Code for the test cases 108 can be expressed in one or more classes 116A, 116B, . . . 116N, etc. (referred to collectively herein as "classes 116"). Each of the classes 116 can include one or more methods 118. For example, different classes 116 can be associated with different class files, each of which includes code for one or more methods 118. Individual methods 118 can set up data in the database 104 for tests, test functionality associated with the software application 102, output test results, or perform any other operation associated with testing of the software application.

Each method in a class may be a function, such as a function written in Gosu®, Java®, or another programming language. As an example, a file for a class can be a .gs file containing Gosu® code for one or more methods 118. The test cases 108 can include any number of files for classes 116, such as class 116A, class 116B, . . . and class 116N, as shown in FIG. 1. For example, class 116A can include methods 118A(1), 118A(2), 118A(3), etc. Different class files can include the same or a different amount of methods 118.

Source code for the software application 102 may similarly include classes 116 and/or methods. For example, the software application 102 may be based on source code stored in .gs class files associated with classes 116, each of which may include methods 118 associated with operations of the software application 102.

Some classes 116 and/or methods 118 may be related or dependent on one another. For example, a software developer may have written a test case that depends on, or builds on, operations the developer assumed another related test case would already have performed. As another example, a test case may be designed to use or edit data in the database 104 that a software developer assumed another related test case would already have created. As still another example, different test cases may be configured to access the same data in the database 104.

However, other classes 116 and/or methods 118 may be unrelated. For example, a first class may be designed to test that a record for an insurance policy in the database 104 can be edited to reflect a renewal of the insurance policy, while a second class is designed to test integration of the software application 102 with an external billing system. In this example, the first class and the second class may be unrelated, because they test different type of functionalities and/or are not designed to access the same data in the database 104.

Test cases 108 and/or the software application 102 can be associated with annotations 120. For example, source code for test cases 108 may be associated with one or more annotations 120 at a class level and/or at a method level. Similar to the test cases 108, the software application 102 may also be coded using Gosu®, Java®, or another programming language that uses classes and methods. Accordingly, source code for the software application may also be associated with one or more annotations 120 at a class level and/or at a method level.

The annotations 120 may be associated with test topics, such as components, functionalities, or other aspects of the software application 102 or database 104 that can be tested. For example, different annotations 120 may be associated with different data operations, lifecycle operations, integration operations, and/or others type of operations that can be implemented via the software application 102 and/or database 104. Annotations 120 may accordingly indicate that different portions of source code for the software application 102 are related to the same component or functionality. In some cases, annotations 120 associated with test cases 108 may similarly indicate that the test cases 108 are designed to test that component or functionality of the software application 102. Annotations 120 may also allow related or dependent test cases 108 to be identified, based on shared annotations 120.

As a first example of a test topic, an annotation can indicate a type of data operation that a class or method of the test cases 108 is designed to test, such as a data operation of the software application 102 associated with the database 104. For instance, if a class or method of the test cases 108 is designed to test whether the software application 102 can create or edit a customer record in the database 104, an annotation may indicate that the class or method is intended to test interactions between the software application 102 and the database 104 related to customer records 112. The same annotation may be associated with classes or methods in source code for the software application 102 that are configured to implement creating and/or editing customer records in the database 104. If a class or method of the test cases 108 is instead designed to test billing functionality associated with the software application 102, a corresponding annotation may instead indicate that the class or method is testing the billing functionality. That same annotation may similarly be associated with classes or methods in source code for the software application 102 that are associated with billing functionality.

As a second example of a test topic, an annotation can indicate a type of lifecycle operation that a class or method of the test cases 108 is designed to test, and/or that the software application is designed to implement. A lifecycle operation can relate to one or more stages of a lifecycle of a product or service. For instance, if the software application 102 is an insurance policy management system, different aspects of the software application 102 may relate to different aspects of the lifecycle of an insurance policy, such as providing a quote for the insurance policy, binding the insurance policy to a customer, changing the insurance policy, renewing the insurance policy, and/or canceling the insurance policy. Accordingly, annotations 120 may indicate that different classes and/or methods of test cases 108 are intended to test types of operations associated with different aspects of the insurance policy lifecycle. For instance, a first annotation may indicate that a first class is designed to test whether a record for a new insurance policy can be created in the database 104, while a second annotation may indicate that a second class is designed to test whether data in the database 104 can be created or edited to reflect a renewal of the insurance policy. In other examples, annotations 120 may indicate types of insurance policies associated with test cases 108. For instance, annotations 120 may indicate that one class or method is specifically associated with testing management of automobile insurance policies, but another class or method is specifically associated with testing management of homeowner insurance policies. The same or similar annotations 120 may be associated with classes and/or methods in source code of the software application 102 that are also associated with different aspects of the insurance policy lifecycle, and/or with different types of insurance policies.

As a third example of a test topic, an annotation can indicate a type of integration operation of the software application 102 that a class or method of the test cases 108 is designed to test. For instance, the software application 102 may integrate with other external applications, such as an external billing system or an external customer management system. Accordingly, a first annotation may indicate that a first class is designed to test integration of the software application 102 with the external billing system, while a second annotation may indicate that a second class is designed to test integration of the software application 102 with the external customer management system. The same or similar annotations 120 may be associated with classes and/or methods in source code of the software application 102 that are also associated with integrations with external systems.

In some examples, the annotations 120 can be comments, keywords, tags, or other values inserted into source code for test cases 108 and/or the software application 102. For instance, an annotation can be a block comment, line comment, or any other type of comment, data, or non-executable code inserted into source code for a test case or for the software application 102. Such comments or non-executable data can identify test topics associated with the annotations 120. In some cases, an annotation in the source code can be a comment that, in addition to including an indication of a test topic, also includes an annotation signifier that differentiates the annotations 120 from other comments in the source code. For instance, a comment may include "tag," "annotation," "test topic," or another word or signifier that indicates that the comment is an annotation.

In other examples, the annotations 120 can be metadata associated with .gs files or other types of files for the test cases 108 and/or the software application 102. In yet other examples, the annotations 120 can be included in one or more configuration or property files. For instance, a configuration file for the software application 102 may indicate annotations 120 that are associated with corresponding components and/or functionalities of the software application 102.

Overall, classes 116 and methods 118, of the test cases 108 and/or software application 102, that are related or dependent on one another can be associated with the same annotations 120. For instance, as discussed above, some test cases 108 may be designed to build on one other such that a particular test case may be configured to create data in the database 104 that another test case is configured to use. Additionally, multiple test cases 108 may use the same data in the database 104. Accordingly, such test cases 108 that build on each other or use the same data in the database 104 can be associated with the same annotation to indicate that the test cases 108 are related or dependent. As a non-limiting example, if method 118A(3) and method 118B(2) are both configured to test that a record in the database 104 for an automobile insurance policy can be edited in different ways, then method 118A(3) and method 118B(2) can each be associated with the same annotation indicating that the two methods are related to editing a record for an automobile insurance policy. Similarly, if different test cases 108 are configured to access the same record or table in the database 104, and/or are associated with same test topic, the different test cases 108 can have the same annotation to indicate that the test cases 108 are related.

A class can be associated with one or more annotations 120 that apply to the entire class. For example, an annotation associated with a class may indicate that all of the methods 118 of that class are associated with a particular test topic indicated by the annotation. Accordingly, some annotations may be class-level annotations associated with classes in source code for one or more test cases 108 and/or for the software application 102.

Methods may also be individually associated with one or more annotations 120. As a non-limiting example, method 118A(2) and method 118A(3) in class 116A may each be individually associated with copies of a particular annotation, while method 118A(1) in class 116A is not associated with a copy of that particular annotation. In this example, the annotations 120 may indicate that method 118A(2) and method 118A(3) are related, and that method 118A(1) is not related to method 118A(2) and method 118A(3). Accordingly, some annotations may be method-level annotations associated with methods in source code for one or more test cases 108 and/or for the software application 102.

In some examples, a computing system can add annotations 120 to class files associated with test cases 108 and/or the software application 102 based on user input from software developers or other users. For example, as discussed further below with respect to FIG. 2, a software developer can provide input to an IDE, text editor, or other programming environment or tool that causes the computing system to add comments or other types of annotations to source code for test cases 108 and/or for the software application 102.

However, in other examples, a computing device may automatically add annotations 120 to class files. For example, a machine learning model or other artificial intelligence can be trained on historical and/or example training data that associates various test topics with example classes 116 and/or methods 118. The machine learning model or other artificial intelligence may use example data to determine which types of functions, variable names, database operations, and/or other elements of classes 116 and/or methods 118 in source code for test cases 108 and/or the software application 102 correspond to different types of test topics, such as different types of data operations, lifecycle operations, integration operations, and/or other operations. The machine learning model or other artificial intelligence can thus be trained to identify which types of classes 116 and/or methods 118 correspond with which test topics.

Accordingly, the trained machine learning model or other artificial intelligence can be configured to evaluate new classes 116 and/or methods 118, determine which test topics correspond to the new classes 116 and/or methods 118, and can add annotations 120 associated with the test topics to the new classes 116 and/or methods 118. The machine learning model or other artificial intelligence can be based on convolutional neural networks, recurrent neural networks, or other types of neural networks, nearest-neighbor algorithms, regression analysis, decision trees, and/or other types of artificial intelligence or machine learning frameworks.

In addition, or alternatively, a computing device may automatically add annotations 120 to source code for test cases 108 and/or the software application 102 based on comparisons between portions of the source code. For example, the computing device can analyze source code for the set of test cases 108 and/or the software application 102 to determine which classes 116 and/or methods 118 use the same variable names, reference the same tables and/or records in the database, and/or have other common or similar elements. The computing device may be configured to automatically add the same annotations 120 to different classes 116 and/or methods 118 that use the same variable names, reference the same tables and/or records in the database, and/or have other common or similar elements. In some examples, the computing device may execute the test cases 108 and/or the software application 102 to monitor which operations access or use the same data in the database 104, and automatically assign the same annotations 120 to corresponding portions of source code that access or use the same data in the database 104. In some cases, the computing device may automatically annotate source code for test cases 108 and/or the software application 102 based on class names, product names or names external systems associated with the test cases 108 or the software application 102, and/or other data referenced in the source code.

In some examples, the computing device that executes the test manager 106 can add annotations 120 to source code automatically based on machine learning, other artificial intelligence, and/or comparison operations, either as part of the test manager 106 or as a separate process. In other examples, a different computing device can automatically add the annotations 120 to source code based on machine learning, other artificial intelligence, and/or comparison operations. For example, a separate server or computing device that generates and/or compiles test cases 108 before providing the set of test cases 108 to the test manager 106 can be configured to automatically add annotations 120 to the test cases 108. For instance, an IDE or other programming environment or tool that software developers use to generate source code for new test cases 108 or edit source code for the software application 102 can be configured to automatically add new annotations 120 to the source code based on machine learning, other artificial intelligence, and/or comparison operations.

As discussed above, the system 100 for testing the software application 102 can include the test manager 106. The test manager 106 can be an executable software component or script that is configured to manage the execution of the test cases 108, including classes 116 and/or methods 118, with respect to the software application 102. In some examples, the test manager 106 can be associated with a build automation tool, such as Gradle®, that can build new versions of the software application 102, initialize an execution environment for the software application 102, and/or define tasks to be executed with respect to the software application 102. For example, the test manager 106 may create one or more Gradle® executors, or other scripts, code, configurations, or computer-executable instructions that cause one or more instances of the software application 102 to execute test cases 108 of different test sets 110 in association with the database 104, or otherwise cause the different test sets 110 to be executed in association with the database 104.

The test manager 106 can be configured to distribute at least some of the test cases 108 among different test sets 110 based on the annotations 120. For example, as shown in FIG. 1, the test manager 106 can distribute at least some of the test cases 108 into any number of test sets 110A, 110B, ... 110N, etc. (referred to collectively herein as "test sets 110"). The test sets 110 can be executed concurrently, in parallel. In some examples, different test sets 110 can be executed concurrently, in parallel, against the same database 104. In other examples, each test set can be associated with different and independent instance of the database. Accordingly, in these examples, different test sets 110 can be executed concurrently, in parallel, against different instances of the database 104.

The test manager 106 can be configured to identify related test cases 108 that share the same annotations 120. The test manager 106 can assign a group of related test cases 108 to the same test set. Accordingly, the test manager 106 can distribute different groups of related tests cases 108 among different test sets 110. The different test sets 110 can then be executed in parallel.

For example, the test manager 106 can obtain a list object, or other data, that identifies individual test cases 108. The test manager 106 can also use the annotations 120 associated with the individual test cases 108 to identify related test cases 108 that have the same annotations 120. The test manager 106 may also use annotations 120 associated with the software application 102 to identify test cases 108 that are related to elements of the software application 102. The test manager 106 can in turn distribute related test cases 108 to the same test sets 110. As a non-limiting example, the test manager 106 may assign a first group of related test cases 108 associated with a first annotation to test set 110A, and assign a second group of related test cases 108 associated with a second annotation to test set 110B.

In some examples, the test manager 106 may distribute test cases 108 to test sets 110 at a class level. For example, the test manager 106 may use class-level annotations 120 that apply to entire classes 116 to identify one or more classes 116 that have the same annotations 120, and/or classes 116 with annotations 120 shared by corresponding elements of the software application 102. The test manager 106 can accordingly distribute all of the methods 118 from one or more classes 116 with the same class-level annotations 120 to the same test set. As a non-limiting example, if class 116A and class 116B are associated with the same annotation, the test manager 106 may assign all of the methods 118A of class 116A, and all of the methods 118B of class 116B, to the first test set 110A, and assign methods of other classes 116 that have different annotations to other test sets 110.

In some examples, the test manager 106 may also, or alternately, distribute test cases 108 to test sets 110 at a method level. For example, the test manager 106 may use method-level annotations 120 that apply to individual methods 118 to identify one or more methods 118 in the same class, and/or in different classes 116, that have the same annotations 120. The test manager 106 may also use method-level annotations 120 to identify individual methods 118 in test cases 108 that are associated with annotations 120 shared by elements of the software application 102. The test manager 106 can accordingly distribute all of the methods 118, across any or all of a set of classes 116, that are associated with the same annotations 120 to the same test set. As a non-limiting example, if method 118A(3) of class 116A and method 118B(3) of class 116B are both associated with the same annotation, the test manager 106 can assign method 118A(3) and method 118B(3) to the same test set.

If different methods 118 within the same class have different annotations 120, the test manager 106 may also distribute methods 118 of the same class to different test sets 110 at a method level, based on the different annotations 120. As a non-limiting example, the test manager 106 may assign methods 118A(1) and 118A(2) of class 116A to the first test set 110A if methods 118A(1) and 118A(2) both have the same annotation, but assign method 118A(3) of class 116A to the second test set 110B if method 118A(3) has a different annotation.

In some examples, the test manager 106 can use annotations 120 to identify groups of related test cases 108 within the full set of test cases 108. The test manager 106 can thus distribute related test cases 108 among the test sets 110 to be executed in parallel, with tests cases 108 of each related group being assigned to the same test set.

However, in other examples, the test manager 106 can use annotations 120 to first identify a specific subset of the test cases 108 that are relevant to code changes associated with the test cases 108 and/or the software application 102. For instance, when code associated with one test topic is changed for one or more test cases 108 and/or the software application 102, the full set of test cases 108 may not be relevant to the code changes because many of the test cases 108 may be associated with other test topics. However, the annotations 120 can indicate which test cases 108 are relevant to the code changes. Accordingly, the test manager 106 can be configured to identify, based on the annotations 120, a subset of the test cases 108 that are relevant to specific code changes. Within the identified relevant subset of test cases 108, the test manager 106 can use the annotations 120 to identify groups of related test cases 108. The test manager 106 can accordingly distribute different groups of related tests cases 108, from the identified subset of relevant test cases 108, among different test sets 110 to be executed in parallel.

In some examples, the test manager 106 can be configured to compare a previous version of source code for test cases 108 and/or the software application 102 against a new version of source code for the test cases 108 and/or the software application 102. The test manager 106 can use such a comparison to determine differences between old and new versions of the source code. The test manager 106 can also analyze the differences in the source code to determine which annotations 120 are associated with the changes to the source code. For example, if source code for the software application 102 has been changed, the changed source code may directly include annotations 120 associated with the changed portions of source code. Accordingly, the test manager 106 can use annotations 120 to identify a group of test cases 108 that are relevant to the changes in the source code for the software application 102. In other examples, the test manager 106 may analyze variable names, function names, comments, or other attributes of the source code to determine which test topics, and which corresponding annotations 120, are relevant to the code changes. The test manager 106 can then identify test cases 108 that are also associated with the identified annotations 120.

By identifying and executing just a subset of the test cases 108 relevant to specific code changes, overall testing times can be reduced relative to executing the full set of test cases 108. Similarly, by identifying and executing just a subset of the test cases 108 relevant to specific code changes, overall usage of computing resources during testing can be reduced relative to executing the full set of test cases 108.

As a first example, a particular test case may be configured to test that a record for an automobile insurance policy can be changed in the database 104. The particular test case can be associated with an annotation that identifies an "auto policy change" test topic, as can other related test cases 108 that also test whether records for automobile insurance policies can be changed in the database 104. However, if there are seven thousand test cases 108 in total, and only three hundred of the test cases 108 are associated with the "auto policy change" test topic, 6700 of the test cases 108 may be associated with other, different, test topics. If code for the particular test case is changed, that code change may potentially impact or conflict with the other test cases 108 associated with the "auto policy change" test topic, but the code change may be unlikely to impact or conflict with the 6700 other test cases 108 associated with other test topics. Accordingly, the test manager 106 can use the annotations 120 to identify the subset of three hundred test cases 108 that are relevant to the "auto policy change" test topic, and cause just those three hundred relevant test cases 108 to be executed instead of the full set of seven thousand test cases 108. The subset of three hundred relevant test cases 108 can execute more quickly than the full set of seven thousand test cases 108.

In this example, the test manager 106 may also use annotations 120 to identify groups of related test cases 108 within the subset of three hundred relevant test cases 108. For instance, although the identified subset of three hundred relevant test cases 108 may all be associated with the "auto policy change" test topic, only some of those test cases 108 may be related to each other because they depend on data created or used by other test cases 108. Accordingly, the test manager 106 can use annotations 120 to identify related test cases 108 that share the same annotations 120, and assign different groups of related test cases 108 to different test sets 110 to be executed in parallel. Executing the three hundred related test cases 108 in parallel can further reduce overall testing times, relative to executing the three hundred related test cases 108 in sequence, or executing the full set of seven thousand test cases 108 in sequence or in parallel.

As a second example, a previous version of the software application 102 may have passed all of the test cases 108. However, relatively small source code changes may be made to adjust how the software application 102 implements a change to a customer's mailing address in the database 104. If no other changes are made to the source code for the software application 102, a new version of the software application 102 that is compiled based on the changed source code may be unlikely to fail test cases 108 associated with other test topics different from testing changes to a customer's mailing address in the database 104. Accordingly, it may be possible to perform sufficient testing of the new version of the software application 102 just based on test cases 108 that are designed to test that changes to a customer's mailing address can be made in the database 104, because that test topic corresponds to the code changes made to the software application 102. In this situation, the test manager 106 can be configured to determine which portions of source code for the software application 102 have changed, identify one or more annotations 120 that correspond to the code changes, identify a subset of relevant test cases 108 associated with the one or more identified annotations 120, and execute just the identified subset of relevant test cases 108 instead of the entire set of test cases 108. In some examples, changes to source code for the software application 102 can be annotated with the same, or corresponding, annotations 120 to indicate which test cases 108 are relevant to the code changes. The test manager 106 can also be configured to identify groups of related test cases 108 within the subset of relevant test cases 108, and distribute the test cases 108 among test sets 110 such that related test cases 108 are assigned to the same test sets 110.

In some examples, the test manager 106 may be configured to identify a subset of relevant test cases 108 based on class-level annotations, and identify groups of related test cases 108 within the subset based on class-level and/or method-level annotations. For instance, the test manager 106 may identify three hundred classes 116 that are relevant to an "auto policy change" test topic based on corresponding class-level annotations 120. The test manager 106 can then use other class-level annotations 120 or method-level annotations 120 to identify different groups of related classes 116 and/or methods 118 within the subset of three hundred relevant classes 116. The test manager 106 can assign the different groups of related classes 116 and/or methods 118 among different test sets 110 to be executed in parallel.

In some cases, the test manager 106 may dynamically distribute a substantially equal number of test cases 108 to different test sets 110. For instance, the test manager 106 may use annotations 120 to identify three distinct groups of related test cases 108. If the first and second groups of related test cases 108 have fifty methods each, and the third group of related test cases 108 includes one hundred methods, the test manager 106 may assign the first and second groups to a first test set and the third group to a second test set, such that the first test set and the second test set each have one hundred methods in total.

In other cases, the test manager 106 may dynamically distribute an unequal number of test cases 108 to different test sets 110, for instance based on predicted execution times or other factors. As a first non-limiting example, the test manager 106 may determine that a first set of two distinct groups of related test cases 108, that collectively contains six hundred methods 118, is expected to take approximately five minutes to execute. The test manager 106 may also determine that a second set of related test cases 108, that collectively contains three hundred methods, is also expected to take approximately five minutes to execute. Accordingly, the test manager 106 may assign the six hundred methods from the first set to a first test set, and assign the three hundred methods from the second set to a second test set, such that the first test set and the second test set are each expected to execute in approximately five minutes. This may eliminate or reduce idle processor cycles or server time, relative to assigning each distinct group of related test cases 108 to different test sets with different execution times and waiting for some to finish executing after others have separately finished executing in other parallel threads.

The test manager 106 can also be configured to cause different test sets 110 to execute simultaneously, in parallel, in association with the software application 102 and the database 104. For example, a computing device can initiate a first instance of the software application 102 in a first parallel thread, and also initiate a second instance of the software application 102 in a second parallel thread. The computing device can accordingly execute a first set of methods 118 assigned to the first test set 110A in the first parallel thread, and simultaneously execute a second set of methods 118 assigned to the second test set 110B in the second parallel thread.

In some examples, test cases 108 assigned to a particular test set may execute in sequence with respect to other test cases 108 within the same test set 110. For example, a set of methods 118 assigned to the particular test set may execute in sequence.

In other examples, different subsets of test cases 108 within a particular test set may execute in parallel. For example, if six hundred test cases 108 are associated to a test set, those six hundred test cases 108 may be further divided into three subsets that each contain two hundred test cases 108. These subsets, within a single test set, may execute in different parallel threads at substantially the same time.

The test manager 106 may also collect test results associated with the test cases 108 of different test sets 110 that execute in different parallel threads. The test manager 106 may combine the test results into an aggregated test result report, for example as discussed further below with respect to FIG. 3.

The computing device can use virtual machines, hyper-threading, parallel threads, and/or any other type of parallelization to execute test cases 108 assigned to different test sets 110 in parallel at substantially the same time. The computing device can set up and use any number of parallel threads, depending on the memory, processing power, and/or other computing resources available to the computing device. For example, the computing device can be a server that has 128 GB of memory and 16 CPUs. In this example, if different instances of the software application 102 each use approximately 15 GB of memory when executed via virtual machines, the computing device may initialize eight parallel threads that are each allocated 16 GB of memory. The test manager 106 can accordingly distribute the test cases 108 among eight test sets 110 that correspond to the eight parallel threads.

In some examples, the test manager 106 can use a Java® concurrent "ExecutorService," or other system, to initialize a fixed number of parallel threads in a thread pool, distribute methods 118 of the test cases 108 among different test sets 110 associated with different initialized parallel threads, and use one or more callable objects to execute the methods 118 of the different test sets 110 in association with the parallel threads. In some examples, the test manager 106 can use tasks or scripts associated with a build automation tool, such as Gradle®, to identify related test cases 108 based on annotations 120, distribute the related test cases 108 among test sets 110, and to cause execution of the test sets 110 in parallel. For example, the test manager 106 can use Gradle® tasks or other scripts to dynamically set up different executors associated with the software application 102 in different parallel threads, identify related test cases 108 based on annotations 120, distribute the related test cases 108 among different test sets 110 associated with the parallel threads at a class level and/or a method level, cause the different executors to execute the methods 118 of the test sets 110 in parallel, and/or to combine corresponding sets of test results into an aggregated test result report.

As a non-limiting example, if the full set of test cases 108 contain seven thousand classes 116, the test manager 106 may use class-level annotations 120 to identify seven distinct groups of related classes 116 within the full set of seven thousand classes 116. The test manager 106 can assign the classes 116 into seven different test sets 110, such that each different test set contains classes 116 associated with a different annotation. Each of the seven test sets 110 can be associated with a different thread of a pool of seven parallel threads. The test manager 106 can cause the seven test sets 110 to be executed in parallel, substantially simultaneously, via the seven different parallel threads. Accordingly, the full set of seven thousand classes 116 may execute in parallel more quickly than the seven thousand classes 116 could execute in sequence in a single thread. Executing the classes 116 in parallel can also reduce server time or usages of other computing resources, relative to executing the classes 116 in a single thread.

As another non-limiting example, if the full set of test cases 108 contain seven thousand classes 116, the test manager 106 may identify code changes relevant to one or more specific annotations 120. The test manager 106 may determine that a subset of seven hundred classes 116 are associated with the annotations 120 that correspond to the code changes. The test manager 106 can distribute the subset of seven hundred classes 116 among seven different test sets 110 at a class level and/or a method level. Each of the seven test sets 110 can be associated with a different thread of a pool of seven parallel threads. The test manager 106 can cause the seven test sets 110 to be executed in parallel, substantially simultaneously, via the seven different parallel threads. Accordingly, the test manager 106 can cause the seven hundred classes 116 that are relevant to the code changes to execute, in parallel, more quickly than the full set of seven thousand classes 116 could execute in sequence or in parallel. Reducing the number of test cases 108 to execute, and executing those test cases 108 in parallel, can also reduce server time or usages of other computing resources, relative to executing the all seven thousand classes 116 in a single thread or in parallel.

As discussed above, some test cases 108 may depend on each other and/or access the same records or tables in the database 104. If such test cases 108 were executed in parallel in different parallel threads, there is a risk that some classes 116 and/or methods 118 may execute in different parallel threads in a different order than intended by developers. In some cases, executing related or dependent test cases 108 in a different order than intended in parallel threads could lead to database errors that could cause test cases 108 to fail. For example, if a first method depends on data that a developer expected a second method would already have created in the database 104, a missing data error could occur if the first method and the second method were assigned to different parallel threads and the first method executes in one parallel thread before the second method executes in another parallel thread. As another example, if two methods are configured to access the same table or record in the database, a table-locking error or record-locking error could occur if the two methods were assigned to different parallel threads and execute at substantially the same in the different parallel threads. However, as discussed above, the test manager 106 can use annotations 120 to identify related test cases 108. By assigning related test cases 108 to the same test sets 110, the test manager 106 can reduce or eliminate the risk of database errors when executing test cases 108 in parallel during testing of the software application 102.

For example, if method 118A(1) and method 118B(2) are both configured to access the same record or table in the database 104, method 118A(1) and method 118B(2) may be associated with the same annotation. Based on that shared annotation, the test manager 106 can assign method 118A(1) and method 118B(2) to the same test set, such that method 118A(1) and method 118B(2) will be executed at different times in the same parallel thread associated with that test set. Accordingly, the test manager 106 can avoid table-locking errors or record-locking errors that might otherwise have occurred if method 118A(1) and method 118B(2) were assigned to different test sets 110 and attempted to concurrently access the same record or table in the database 104 in different parallel threads.

As another example, if class 116A includes one or more methods 118A that create data in the database 104 that is used by one or more methods 118B in class 116B, class 116A and class 116B can be associated with the same annotation. Based on that shared annotation, the test manager 106 can assign methods 118A and methods 118B to the same test set, such that methods 118A will be executed before methods 118B in the same parallel thread associated with that test set. Accordingly, the test manager 106 can avoid missing data errors that might otherwise have occurred if methods 118A and methods 118B were assigned to different test sets 110, and methods 118B executing in one parallel thread attempted to use data that had not yet been created in the database 104 by one or more of methods 118A executing in another parallel thread.

In some examples, different test sets 110 can be executed in parallel against a single instance of the database 104. As discussed above, the test manager 106 can reduce the risk of database errors by assigning related test cases 108 to the same test set, such that methods of the test set are executed in sequence with respect to other methods in the test set. However, in other examples, each test set 110 can be associated with a separate instance of the database 104. Accordingly, even if test cases 108 that are assigned to different test sets 110 concurrently attempt to access the same data in the database 104, table-locking errors and/or record-locking errors can be avoided because test cases 108 in different test sets 110 can simultaneously access different copies of the data in different instances of the database 104. Additionally, in some examples, the database 104 can also be instantiated as a record-locking database rather than a table-locking database. The use of a record-locking database can avoid table-locking errors if test cases 108 that are assigned to different test sets 110 concurrently attempt to access different records in the same table of the same database 104.

Overall, the test manager 106 can reduce the time it takes to test a version of the software application by using annotations 120 to identify test cases 108 relevant to code changes, and/or to identify related test cases 108. The test manager 106 can also distribute related test cases 108, identified based on annotations 120, among different test sets 110 associated with different parallel threads. In some examples, as discussed below with respect to FIG. 2, the annotations 120 can be added to source code for the test cases 108 and/or the software application 102 by a computing device associated with a software developer. Alternatively, the annotations 120 can be automatically added to source code for the test cases 108 and/or the software application 102 by a computing via machine learning, artificial intelligence, and/or comparison operations. Because the test manager 106 can use annotations 120 to identify related test cases 108, and to assign related test cases 108 to the same test sets 110, database errors that might otherwise occur when executing related test cases 108 in different parallel threads can be reduced and/or eliminated.

Figure 2:
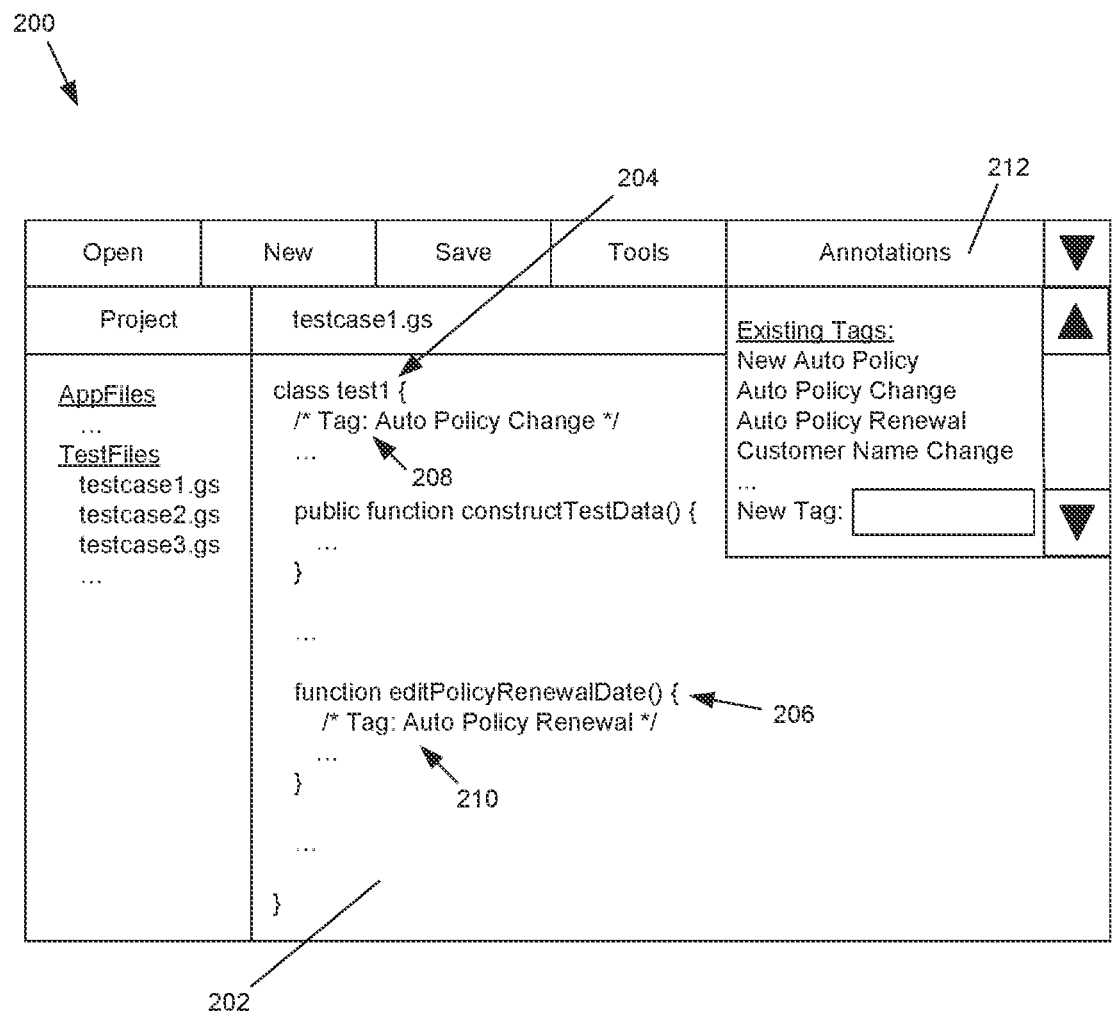
FIG. 2 shows an example user interface for a programming environment associated with test cases and/or the software application.

FIG. 2 shows an example user interface (UI) 200 for a programming environment associated with the test cases 108 and/or the software application 102. The UI 200 may be part of an IDE, text editor, or other programming environment or tool. In some examples, the UI 200 may execute on the same computing device as the test manager 106. However, in other examples, the UI 200 may execute on a different computing device than the test manager 106, for instance on a computing device associated with a software developer who is writing code for one or more test cases 108 before submitting the test cases 108 to the test manager 106 for execution when testing the software application 102.

The UI 200 can include a text window 202 that displays source code for a test case or for the software application 102. As discussed above, classes 116 can include one or more methods 118. Accordingly, the source code shown in the text window 202 can include code for a class 204, which may encompass code for method 206 and/or other methods 118. As shown in FIG. 2, code for the class 204 can include a first annotation 208, and code for the method 206 can include a second annotation 210.

The first annotation 208 can be a class-level annotation that applies to all of the methods of class 204, including method 206. As a non-limiting example, the first annotation 208 may be associated with an "auto policy change" test topic, to indicate that the methods 118 of the class 204 are intended to test that records 112 for automobile insurance policies can be changed in the database 104. If any other classes 116, and/or individual methods 118 of other classes 116, are also associated with testing that the records 112 for automobile insurance policies can be changed in the database 104, those other classes 116 and/or methods 118 can also be associated with the first annotation 208. Classes 116 and/or methods 118 in source code for the software application 102 that are also associated with functionality to change records 112 for automobile insurance policies may similarly be associated with the first annotation 208.

The second annotation 210 can be a method-level annotation that applies specifically to method 206. As a non-limiting example, the second annotation 210 may be associated with an "auto policy renewal" test topic, to indicate that method 206 is intended to test whether a record for an automobile insurance policy can be updated to reflect a renewal of the automobile insurance policy for a new term. If any other methods 118 in class 204, methods 118 in other classes 116, and/or other entire classes 116 are also associated with testing that whether a record for an automobile insurance policy can be updated to reflect a renewal of the automobile insurance police, those other methods 118 and/or classes 116 can also be associated with the second annotation 210. Classes 116 and/or methods 118 in source code for the software application 102 that are also associated with functionality to renew automobile insurance policies may similarly be associated with the second annotation 208.

In some examples, users can type comments or other types of annotations 120 directly into the text window 202 within code for a class or method. However, in other examples, the UI 200 can include an annotations tool 212. The annotations tool 212 can be a drop-down menu, pop-up window, and/or any other UI element that can display a list of annotations 120. A user can select an annotation from the list in the annotations tool 212 to add the selected annotation to code for a class or method in the text window 202. As an example, selecting an annotation via the annotations tool 212 can cause the selected annotation to be pasted as a comment at a current location of a cursor in the text window 202. In other examples, the annotations tool 212 can also accept user input that identifies a particular class or method to associate with the selected annotation.

The list of annotations displayed in the annotations tool 212 may include predetermined annotations that correspond with a predetermined set of test topics. Alternatively, or in addition, the annotations tool 212 may list annotations that have previously been added to other test cases 108 associated with the same software application 102, and/or to source code for the software application 102. Accordingly, users can use the annotations tool 212 to select annotations 120 for a portion of source code that have been, or can be, associated with other portions of source code.

In some examples, once a user selects a particular annotation via the annotations tool 212 for a particular portion of source code, the computing device may use machine learning, artificial intelligence, and/or comparison operations to identify other related portions of source code, and automatically associate the other related portions of source code with the selected annotation. For example, if a user selects a particular annotation for a particular class, the computing device may identify other related classes that use the same variables, access the same database records or tables, or use the same types of operations. The computing device can then automatically insert the annotation selected by the user into the identified related classes, or display suggestions in the UI 200 to add the selected annotation to the identified related classes. Similarly, the computing device may analyze variable names, database references, or operations associated with new source code being typed by a user into the text window 202, and use similar machine learning, artificial intelligence, and/or comparison operations to identify annotations 120 already associated with other portions of source code that use the same variable names, database references, or operations. The computing device can accordingly display suggestions in the UI 200 to add the automatically-determined annotation to the source code the user is currently working on, based on annotations previously added to similar portions of source code.

In some examples, the annotations tool 212 may also receive user input for new annotations 120. For instance, if a software developer is writing a new test case 108 that tests functionality not associated with any of the pre-populated annotations 120 in the annotations tool 212, the annotations tool 212 may have text field or other user input mechanism that enables the software developer to define and use a new annotation for the new test case 108. If the annotations tool 212 receives user input that defines a new annotation, the annotations tool 212 can add the new annotation to the pre-populated list of existing annotations. Accordingly, the annotations tool 212 can display the new annotation to the same software developer and/or other software developers in the future, and the new annotation can be selected and used in association with other test cases 108 or corresponding portions of source code for the software application 102.

The UI 200 can enable users to provide input directly into the text window 202 and/or via the annotations tool 212 that causes a computing device to add annotations 120 to source code. In other examples, a computing device associated with the UI 200 can also, or alternatively, use machine learning, other artificial intelligence, or comparison operations to identify test topics associated with portions of source code and/or identify related portions of source code, and automatically add corresponding annotations 120 to portions of source code.

Such annotations 120 added to source code for test cases 108 and the software application 102 manually and/or automatically enable the test manager 106 to identify a subset of test cases 108 relevant to code changes, and/or to identify related test cases 108 associated with the same annotations 120, as discussed above with respect to FIG. 1. The test manager 106 can also assign related test cases 108, identified based annotations 120, to the same test sets 110. Different test sets 110, containing different test cases 108, can be executed in parallel to test the software application 102, for example as discussed below with respect to FIG. 3. Executing the test cases 108 in parallel can reduce testing time overall, relative to executing the test cases in sequence. Moreover, by using the annotations 120 to assign related test cases 108 to the same test sets 110, database errors that may otherwise occur when executing related test cases 108 in different parallel threads can be reduced and/or eliminated.

Figure 3:
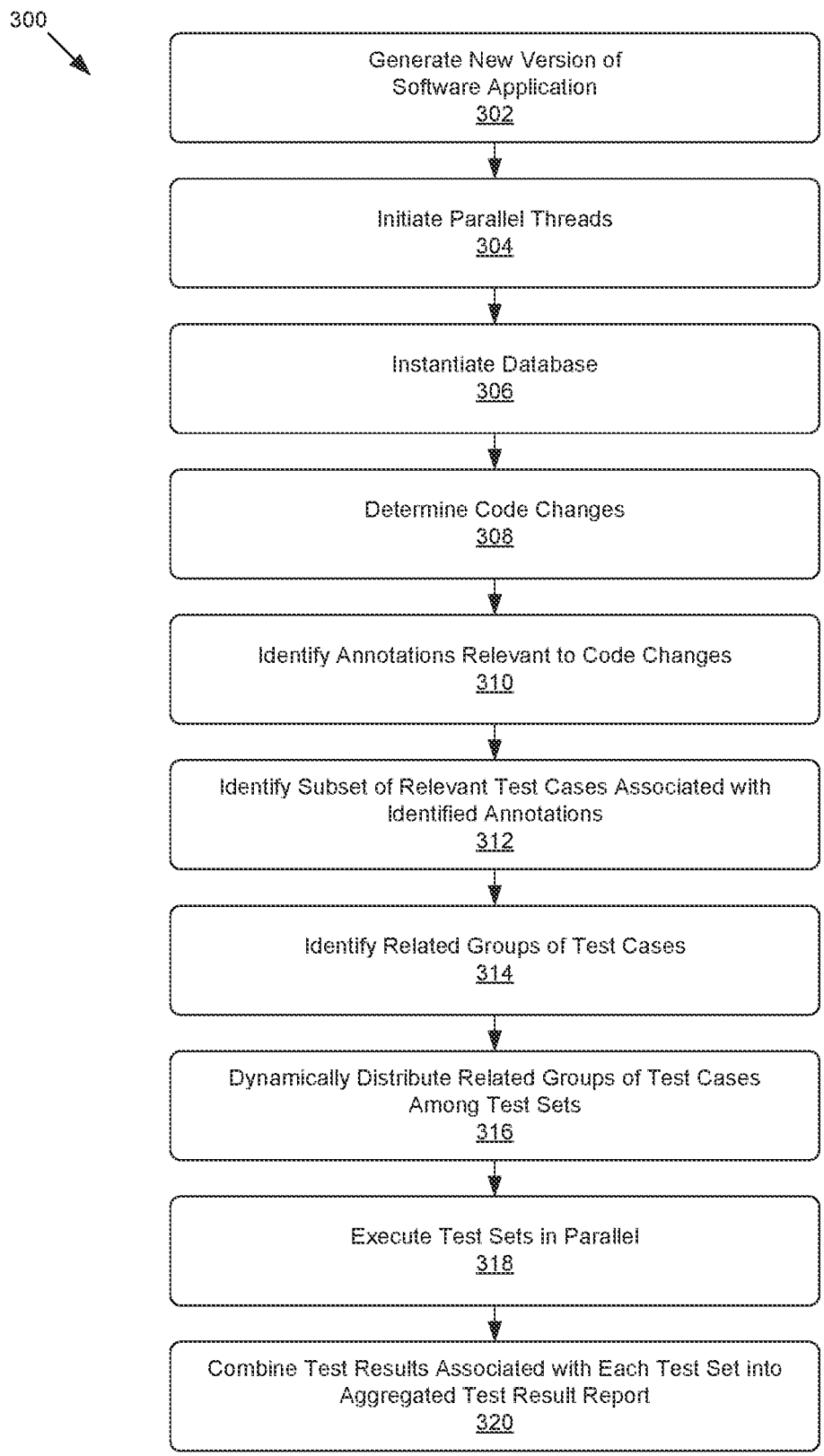
FIG. 3 shows a flowchart of a first example process for generating and testing the software application using parallel threads based in part on annotations.

FIG. 3 shows a flowchart of a first example process 300 for generating and testing the software application 102 using parallel threads based in part on annotations 120. At block 302, a computing system can generate a new version of the software application 102. For example, a developer may have written new code, and/or changed existing code, associated with the software application 102. The developer can submit the new code to a compiler or code management system, and request that the new and/or changed code be compiled, along with unchanged code, into a new executable version of the software application 102. For example, at block 302, the computing system can generate a new version of the software application 102 as a new executable and/or deployable WAR file or JAR file. In some examples, at block 302 the computing system can use tasks of a build automation tool, such as Gradle®, to build the new version of the software application 102.

At block 304, the computing system can initiate a set of parallel threads. For example, the test manager 106 can use Gradle® tasks, or tasks of another build automation tool, to dynamically set up an execution environment that includes a set of parallel threads, and different executors associated with the software application 102 in different parallel threads. In some examples, at block 304 the test manager 106 can use a Java® concurrent "ExecutorService" to initialize a fixed number of parallel threads in a thread pool.

At block 306, the computing system can instantiate the database 104. For example, at block 306 the test manager 106 can use Gradle® tasks, or tasks of another build automation tool, to instantiate the database 104 in memory as an in-memory database, such as a record-locking database, a table-locking database, or any other type of database. As another example, the software application 102 can create the database 104 when the software application 102 is loaded or executed. For instance, the software application 102 can be tightly coupled to the database 104, such that the software application 102 creates the database 104 when the software application 102 executes. In some examples, the computing system can instantiate a single instance of the database 104 that the software application 102 can access via each parallel thread. However, in other examples, the computing system can instantiate different instances of the database 104, such that different instances of the software application 102 associated with different parallel threads can access different instances of the database 104.

At block 308, the computing system can determine code changes associated with the test cases 108 and/or the software application 102. For example, the computing system can compare previous versions of source code for the test cases 108 and/or the software application 102 against current source code for the test cases 108 and/or the software application 102 to determine which portions of the source code have changed.

At block 310, the computing system can identify one or more annotations 120 relevant to the code changes identified at block 308. The annotations 120 identified at block 310 can correspond to test topics associated with the code changes. As an example, if source code for a test case has changed, the computing system can determine if the changed code is associated with a test topic marked by an annotation 120 within the source code for the test case. As another example, if source code for the software application 102 has changed, the computing system can determine if the changed code is associated with one or more annotations 120 included in the source code for the software application 102, or if variable names, operation types, or other data associated with the changed code indicates that the changed code is associated with a test topic that corresponds to an annotation.

At block 312, the computing system can identify a subset of test cases 108 associated with the annotations 120 identified at block 310. The subset of test cases 108 identified at block 312 can accordingly be associated with test topics corresponding to the code changes identified at block 308. For example, although there may be a relatively large number of test cases 108 overall, some of the test cases 108 may relate to other test topics and thus not be associated with the annotations 120 identified at block 310. Accordingly, the computing system can filter the full set of test cases 108 to a subset of test cases 108 relevant to the code changes determined at block 308, based on corresponding annotations 120 determined at block 310.

At block 314, the computing system can identify groups of related test cases 108 within the subset of relevant test cases identified at block 312. For example, at block 314 the computing system can use class-level annotations 120 and/or method-level annotations to identify related test cases 108, within the subset of relevant test cases 108 identified at block 312, that are associated with the same annotations 120. Alternatively, in some examples blocks 308-312 can be skipped, and the computing device can use annotations 120 to identify groups of related test cases 108 within the full set of test cases 108.

At block 316, the computing system can dynamically distribute groups of related test cases 108 among different test sets 110. For example, at block 316 the test manager 106 can assign one or more groups of related test cases 108 to a first test set, one or more other groups of related test cases 108 to a second test set, and still other groups of related test cases to other test sets. Each test set can be associated with a different parallel thread of the parallel threads initiated at block 304. In some examples, the computing system can dynamically distribute groups of related test cases 108 among different test sets 110 based on predicted execution times, aggregated numbers of test cases 108 assigned to each test set 110, and/or other factors.

At block 318, the computing system can cause the test sets 110 to execute, in the parallel threads, in association with the database 104. For example, at block 318 the test manager 106 can use one or more callable objects to execute the methods 118 of the different test sets 110 in association with the parallel threads. Individual test cases 108 in the test sets 110 may succeed or fail when executed at block 318.

At block 320, the computing system can aggregate results of the tests associated with the test cases 108. In some examples, the test manager 106 can receive different sets of test results associated with different test sets 110 that execute in different parallel threads, such as test results indicating whether individual test cases 108 succeeded or failed at block 318. The test manager 106 can combine the different sets of test results into a single aggregated test result report, or otherwise aggregate the test results. The test manager 106 may output the single aggregated test result report, for instance in a format that is visible and/or usable by a user. In other examples, the test manager 106 may aggregate test results into any other format. The aggregated test results may indicate whether the new version of the software application 102 passed all of the test cases 108 executed at block 318. As discussed above, in some examples, the test cases 108 executed at block 318 can be the subset of relevant test cases 108 identified at block 312. However, in other examples in which blocks 308-312 are skipped, the test cases 108 executed at block 318 can be the full set of test cases 108.

The aggregated test results may indicate whether or not the new version of the software application 102 passed all of the test cases 108 executed at block 318. In some examples, if the new version of the software application 102 did not pass all of the test cases 108 executed at block 318, the aggregated test results may identify which test cases 108 did not pass, and/or provide corresponding diagnostic details about test failures and/or errors. Such aggregated test results associated with failed tests may in some cases be used by software developers when re-coding or changing the software application 102 after test failures, as discussed further below with respect to FIG. 4. In some examples, after generating and/or outputting the aggregated test results, the test manager 106 may discard the different individual sets of test results that were generated in association with different test sets 110.

In some examples, at the conclusion of testing, the computing system can also de-allocate memory or other computing resources associated with the software application 102 and the database 104. For example, if server memory had been allocated to execute eight test sets 110 in association with the database 104, the allocated memory can be deallocated and/or cleaned up to prepare the server for a subsequent round of testing.

Process 300 can be used to determine whether a version of software application passes test cases 108, such as a subset of test cases 108 relevant to code changes, or a full set of test cases 108. As will be discussed further below with respect to FIG. 4, if the version of the software application does not pass all the test cases 108 executed at block 318, the version of the software application can be re-coded or otherwise changed until it does pass all of the test cases 108 executed at block 318. However, as will also be discussed below with respect to FIG. 4, if the version of the software application does pass all the test cases 108 executed at block 318, passing all the test cases 108 executed at block 318 may indicate that the version of the software application is suitable to deploy in other environments, such as other testing environments, in other development environments, and/or in production environments.

In some examples, process 300 can be used for local testing of the software application based on changes made by a single developer, and/or for global testing of the software application based on changes made by multiple developers, as discussed further below with respect to FIG. 4. In both situations, by distributing related test cases 108 among different test sets 110 and executing the test sets 110 in parallel, overall testing times can be reduced relative to executing the test cases 108 in sequence. Overall testing times can also be reduced by using the annotations 120 to identify a subset of test cases 108 relevant to code changes, and executing the relevant subset of test cases 108 instead of a full set of test cases 108. Additionally, distributing different groups of related test cases 108 to different test sets 110 can also reduce and/or eliminate database errors that might otherwise occur when different test cases 108 are executed in parallel in a different order than originally intended by developers.

Figure 4:
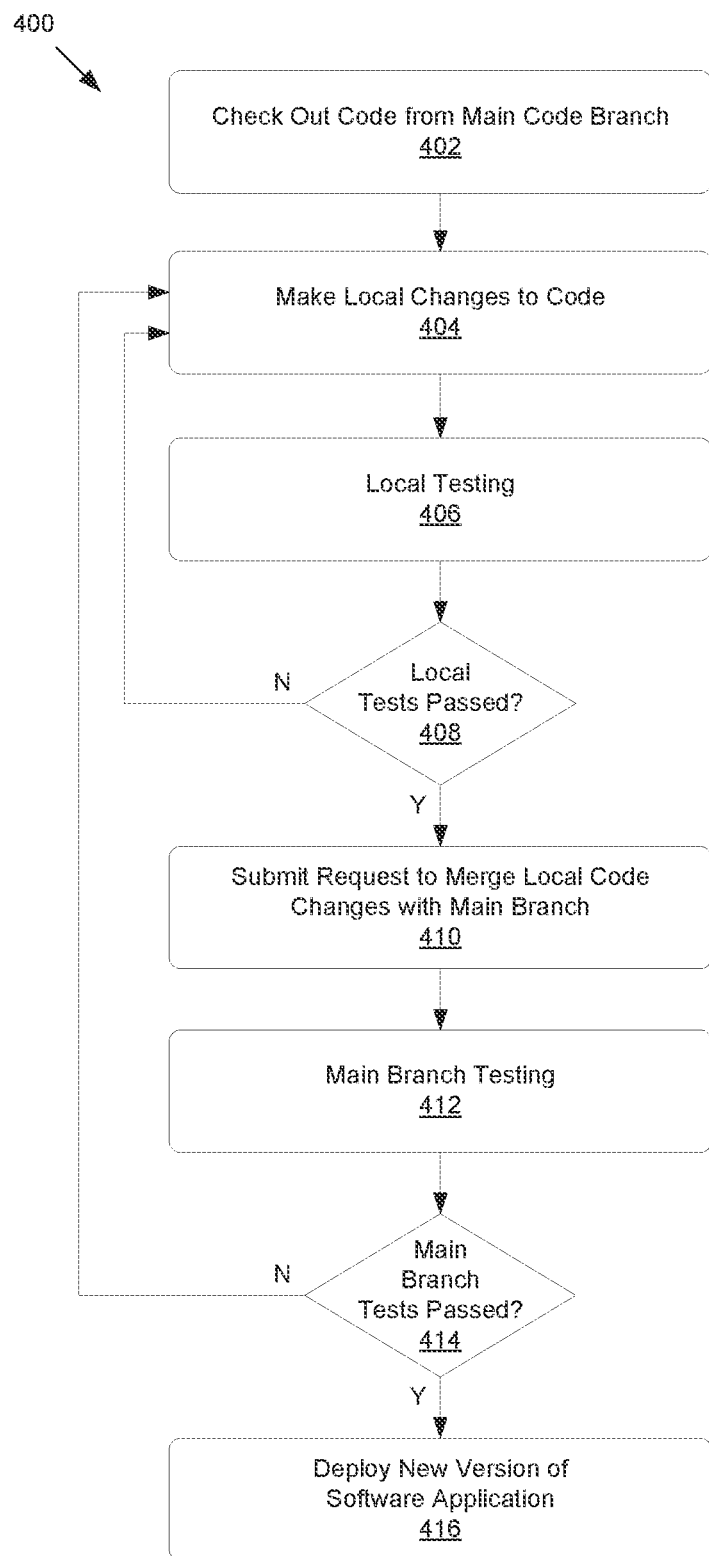
FIG. 4 shows a flowchart of a second example process for testing a software application by executing test cases in parallel based in part on annotations.

FIG. 4 shows a flowchart of a second example process 400 for testing a software application by executing test cases 108 in parallel based in part on annotations 120. At block 402, a computing device associated with a software developer can check out source code associated with the software application associated with the software application 102 and/or the test cases 108 from a main code branch. The source code can be stored in a main code branch at a central repository available to a team of software developers. The computing device may receive a "check out" command from the software developer. Such a "check out" command, or other command, can cause the computing device to retrieve a copy of the source code from the central repository, and thereby check out the source code from the main code branch. Accordingly, at block 402, a computing device associated with a particular software developer can transfer a copy of the source code from the central repository and thus check out a copy of the source code from the main code branch.

At block 404, the computing device can make changes to the source code associated with the software application 102 and/or the test cases 108 locally. The computing device can display the source code within an IDE, text editor, or other programming environment, as shown in FIG. 2. The software developer can type new code and/or input other commends via the IDE, text editor, or other programming environment, which can cause the computing device to edit the source code checked out at block 402.

As an example, input provided by the software developer can cause the computing device to add new code or change existing code associated with the software application. As another example, input provided by the software developer can cause the computing device to add or change configuration files or other settings associated with the software application. As yet another example, input provided by the software developer can cause the computing device to add edit code for test cases 108, including adding one or more new test cases 108, removing one or more test cases 108, and/or changing source code for one or more test cases 108.

At block 406, the computing device can initiate local testing of the software application based on the local changes to the source code associated with the software application and/or the test cases 108. The local testing can include the operations of example process 300 shown and described with respect to FIG. 3. For instance, the computing device, or a separate centralized computing device, can build a new version of the software application based on local code changes made at block 404 associated with the software application and/or the test cases 108, use annotations 120 to identify a subset of test cases 108 relevant to the local code changes made at block 404, distribute related test cases 108 from the subset among different test sets 110, execute the test sets 110 in parallel, and output an aggregated test result report based on test results corresponding to the different test sets. Alternatively, the computing device or centralized computing device can distribute related test cases 108 from a full set of test cases 108 among different test sets 110, execute the related test cases 108 in parallel, and output an aggregated test result report based on test results corresponding to the different test sets.

At block 408, the system can determine whether the new version of the software application, built and tested based on local changes to the source code, passed all of the test cases 108 executed locally in parallel at block 406. If the aggregated test result report indicates that the new version of the software application did not pass all of the test cases 108 executed locally at block 406 (Block 408—No), the software developer can provide input that causes the computing device to make further changes to the source code locally at block 404, and the computing device can retry local testing at block 406. However, if the aggregated test result report indicates that the new version of the software application did pass all of the test cases 108 executed locally (Block 408—Yes), the computing device can submit a merge request at block 410. For example, based on the aggregated test result report indicating that local testing has succeeded, the software developer can input a command that causes the computing device to submit a merge request.

The merge request submitted at block 410 can be a request to combine the local code changes associated with the software application and/or the test cases 108, made at block 404, with the main code branch, such that the code changes become part of the main code branch, override previously existing code in the main code branch, and can be checked out from the main code branch by computing devices associated with other software developers. Although the local code changes may have passed local testing, the main code branch may have changed between blocks 402 and 410, for instance if other code changes made by other software developers have been merged into the main branch such that the local changes made at block 404 to code checked out from the main code branch at block 402 would conflict with more recent changes to the main code branch. To determine if the local code changes would conflict with any other changes made to the main code branch, main branch testing can be performed at block 412.

In some examples, the merge request submitted at block 410 may initiate a code review process by which one or more other software developers review the local code changes associated with the software application and/or the test cases 108 made at block 404. In these examples, if the other software developers do not approve local code changes by made by a software developer as part of the code review process, the software developer can return to make further changes to the source code locally via the computing device at block 404. However, if the other software developers do approve the local code changes as part of the code review process, the main branch testing can be performed at block 412.

The main branch testing performed at block 412 can include the operations of example process 300 shown and described with respect to FIG. 3. For instance, a centralized computing device can build a new version of the software application based on the local code changes associated with the software application and/or the test cases 108 made at block 404 as well as the most recent version of the main code branch. The centralized computing device can also use annotations 120 to identify a subset of test cases 108 relevant to the local code changes made at block 404 and/or other code changes that have been incorporated into the main code branch, distribute related test cases 108 from the subset among different test sets 110, execute the test sets 110 in parallel, and output an aggregated test result report based on test results corresponding to the different test sets. Alternatively, the centralized computing device can distribute related test cases 108 from a full set of test cases 108 among different test sets 110, execute the related test cases 108 in parallel, and output an aggregated test result report based on test results corresponding to the different test sets.

At block 414, the system can determine whether the new version of the software application, built based on a combination of the local changes to the source code associated with the software application and/or the test cases 108 and the most recent version of the source code in the main branch, passed all of the test cases 108 executed at block 412. If the aggregated test result report indicates that the new version of the software application did not pass all of the test cases 108 executed at block 412 (Block 414—No), the software developer can provide input that causes the computing device to make further local changes to the source code at block 404. The computing device can then cause local testing to be retried at block 406 and/or cause main branch testing to be retried at block 412. However, if the aggregated test result report indicates that the new version of the software application built during main branch testing at block 412 did pass all of the test cases 108 executed at block 412 (Block 414—Yes), the new version of the software application built during block 412 can be deployed in other environments at block 416. For example, at block 416, the new version of the software application can be deployed in other testing environments, in other development environments, and/or in production environments.

Process 400 can be used to determine whether a version of software application passes test cases 108 at a local level and/or when merged into a main code branch. In both situations, by distributing related test cases 108 among different test sets 110 and executing the test sets 110 in parallel, overall testing times can be reduced relative to executing the test cases 108 in sequence. Overall testing times can also be reduced by using the annotations 120 to identify a subset of test cases 108 relevant to code changes, and executing the relevant subset of test cases 108 instead of a full set of test cases 108. Additionally, distributing different groups of related test cases 108 to different test sets 110 can also reduce and/or eliminate database errors that might otherwise occur when different test cases 108 are executed in parallel in a different order than originally intended by developers. Process 400 can be performed by a computing device associated with a single developer and/or by a central server or other computing device associated with multiple developers, an example of which is shown and described below with respect to FIG. 5.

Figure 5:
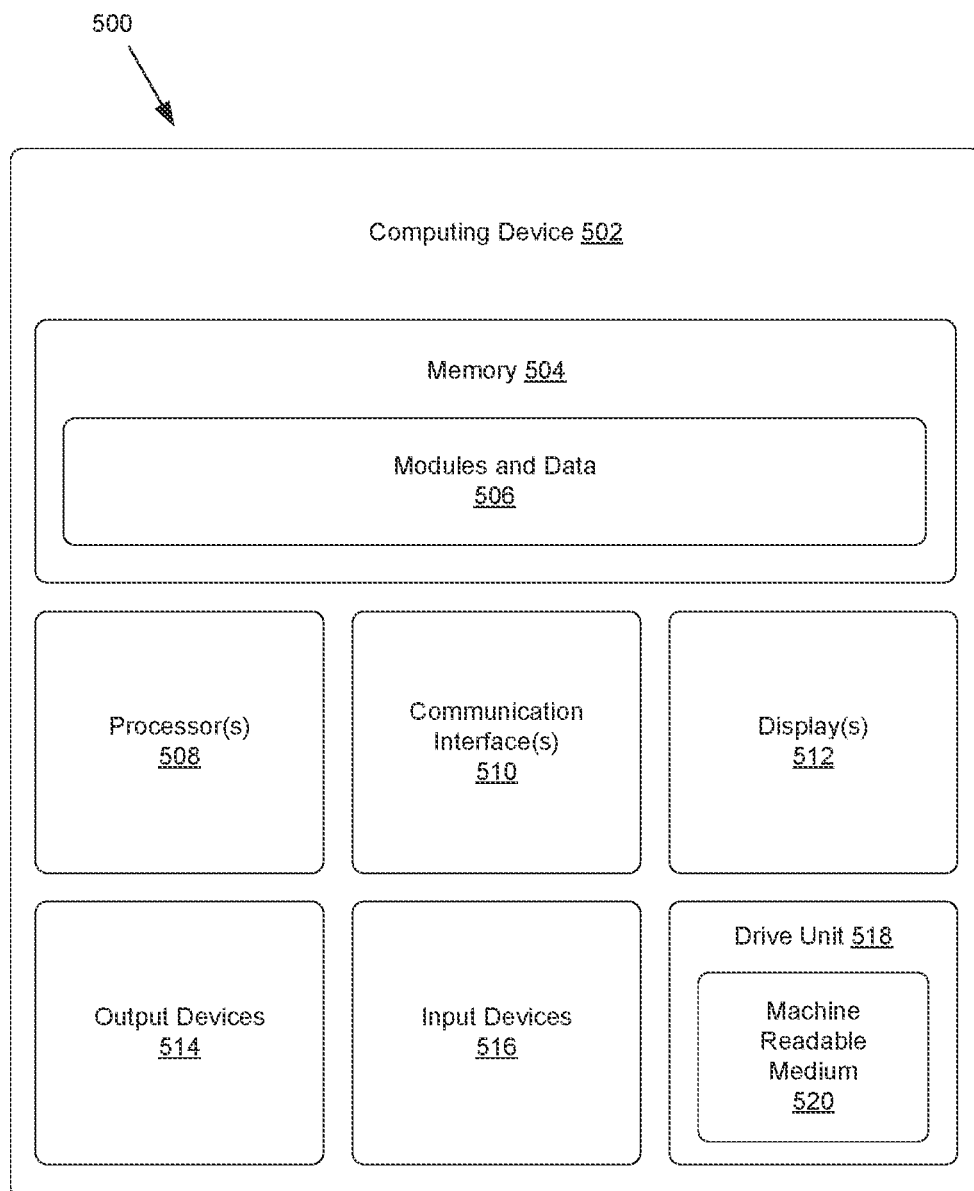
FIG. 5 shows an example system architecture for a computing device.

FIG. 5 shows an example system architecture 500 for a computing device 502 associated with the test manager 106, software application 102, test cases 108, test sets 110, database 104, and/or UI 200 described herein. The computing device 502 can be a server, computer, or other type of computing device that executes the UI 200, the test manager 106, and/or executes instances of the software application 102 and/or test sets 110 in parallel in association with the database 104.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store modules and data 506. The modules and data 506 can include data associated with the test manager 106, the software application 102, the database 104, the test cases 108, the test sets 110, the UI 200, and/or other data. The modules and data 506 can also include any other modules and/or data that can be utilized by the computing device 502 to perform or enable performing any other actions. Such other modules and data can include a platform, operating system, and applications, and data utilized by the platform, operating system, and applications.

As discussed above, the test manager 106 may cause portions of the memory 504 to be allocated to different parallel threads. For instance, the test manager 106 may allocate portions of an overall amount of the memory 504 to different parallel threads, and cause different instances of the software application 102 to execute in the different parallel threads.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

The computing device 502 can execute testing of a software application more quickly and/or with fewer computing resources than other systems. For example, by executing the test manager 106 to identify a subset of test cases 108 relevant to code changes based on annotations 120, the subset of test cases 108 can be executed more quickly than the full set of test cases 108. Additionally, by executing either that subset of test cases 108 or the full set of test cases in parallel, the test cases 108 can be executed more quickly than they could be executed in sequence.

As a non-limiting example, although the computing device 502 might take hours to execute a full set of test cases 108 in sequence, it may take less than an hour to execute a smaller subset of test cases 108 that are relevant to code changes. The testing time can be further reduced by executing different groups of related test cases 108, within the subset of relevant test cases, in parallel. Accordingly, developers can thus be notified whether their code changes pass relevant test cases 108 more quickly, and allow code changes that have passed the relevant test case 108 to be merged into a main code branch more quickly.

Similarly, executing test cases 108 in parallel can also reduce overall usage of computing resources on the computing device 502 when multiple new builds of a software application are tested. As a non-limiting example, although the computing device 502 might take two hours to execute a full set of test cases in sequence, and thus take up to 7200 minutes to test sixty different builds in a day, executing only subsets of the test cases 108 that are relevant to code changes in parallel may reduce testing times per build by at least fifty minutes each. Accordingly, executing related test cases 108 from relevant subsets of test cases in different test sets 110 in parallel may allow the computing device 502 to reduce the time it takes to test all sixty builds by over 3000 minutes per day.

Moreover, because the test manager 106 can use the annotations 120 to identify related test cases 108 and/or test cases 108 related to code changes, and to assign related test cases 108 to the same test sets 110, database errors that could cause failed tests, which may otherwise occur if related test cases 108 are executed in different parallel threads, can be reduced and/or eliminated. For instance, identifying related test cases 108 associated with the same annotation and executing those related test cases 108 in the same parallel thread can avoid table-locking errors, record-locking errors, missing data errors, or other database errors that might otherwise cause related test cases 108 to fail if the related test cases 108 were executed in different parallel threads.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
    identifying, by one or more processors of a computing device, a plurality of test cases associated with a policy management application that interacts with a database and manages policies based on records stored in the database;
    identifying, by the one or more processors, a plurality of annotations associated with the plurality of test cases, the plurality of annotations indicating test topics associated with the plurality of test cases;
    determining, by the one or more processors, a code change associated with at least one of:
        a test case of the plurality of test cases, or
        the policy management application;
    determining, by the one or more processors, a first annotation, of the plurality of annotations, that indicates a first test topic associated with the code change;
    identifying, by the one or more processors, and from among the plurality of test cases, a subset of relevant test cases associated with the first annotation;
    identifying, by the one or more processors, additional annotations, of the plurality of annotations, that:
        are different from the first annotation associated with the code change, and
        indicate one or more additional test topics different from the first test topic;
    dividing, by the one or more processors, the subset of relevant test cases into groups of related test cases based on the additional annotations, wherein:
        different groups of related test cases respectively correspond with different annotations of the additional annotations, and
        test cases within an individual group of related test cases share a same annotation, of the additional annotations, that corresponds with the individual group of related test cases;
    distributing, by the one or more processors, the groups of related test cases among a plurality of test sets; and
    executing, by the one or more processors, the plurality of test sets in parallel.

2. The computer-implemented method of claim 1, wherein the plurality of test cases comprises a set of classes, and individual classes of the set of classes comprise one or more methods.

3. The computer-implemented method of claim 2, wherein the plurality of annotations comprises one or more of:
    class-level annotations associated with one or more classes of the set of classes, or
    method-level annotations associated with one or more of the methods.

4. The computer-implemented method of claim 1, further comprising:
    collecting, by the one or more processors, a plurality of test results associated with the plurality of test sets; and
    aggregating, by the one or more processors, the plurality of test results.

5. The computer-implemented method of claim 1, wherein at least one of the test topics, indicated by the plurality of annotations, is associated with testing one or more types of interactions between the policy management application and the database.

6. The computer-implemented method of claim 1, wherein the test topics, indicated by the plurality of annotations, comprise one or more of:
    data operations associated with one or more types of interactions between the policy management application and the database,
    lifecycle operations associated with management of one or more stages of a lifecycle of a policy, or
    integration operations associated with integration of the policy management application with one or more external systems.

7. The computer-implemented method of claim 1, wherein the plurality of annotations comprises comments within source code for the plurality of test cases.

8. The computer-implemented method of claim 1, further comprising:
    determining, by the one or more processors and using a machine learning model, the plurality of annotations associated with the plurality of test cases; and
    automatically adding, by the one or more processors, the plurality of annotations to the plurality of test cases,
    wherein the machine learning model is trained on training data that indicates example test topics associated with example test cases.

9. The computer-implemented method of claim 1, further comprising:
    causing, by the one or more processors, display of an annotations tool in a user interface of a programming environment associated with the plurality of test cases, wherein the annotations tool is configured to:
    present a list of selectable annotations;
    receive a user selection of a particular annotation; and
    associate the particular annotation with at least one test case.

10. The computer-implemented method of claim 1, wherein determining the first annotation, of the plurality of annotations, associated with the code change comprises identifying a corresponding annotation associated with the policy management application.

11. A computing device, comprising:
one or more processors; and
memory storing computer-executable instructions that, when executed by the one or more processors, cause the computing device to perform operations comprising:
identifying a plurality of test cases associated with a policy management software application that interacts with a database and manages policies based on records stored in the database;
identifying a plurality of annotations associated with the plurality of test cases, the plurality of annotations indicating test topics associated with the plurality of test cases;
identifying a subset of relevant test cases, from among the plurality of test cases, that is associated with a first annotation of the plurality of annotations;
identifying a first group of related test cases, from among the subset of relevant test cases associated with the first annotation, that share a second annotation, of the plurality of annotations, that is different from the first annotation;
identifying a second group of related test cases, from among the subset of relevant test cases associated with the first annotation, that share a third annotation of the plurality of annotations, that is different from the first annotation and the second annotation;
distributing the first group of related test cases to a first test set associated with a first parallel thread;
distributing the second group of related test cases to a second test set associated with a second parallel thread; and
executing the first test set and the second test set in parallel.

12. The computing device of claim 11, wherein identifying the subset of relevant test cases comprises:
determining a code change associated with at least one of:
a test case of the plurality of test cases, or
the policy management application;
determining a test topic associated with the code change; and
identifying the first annotation as an annotation that corresponds to the test topic.

13. The computing device of claim 11, wherein the plurality of test cases comprises a set of classes, and individual classes of the set of classes comprise one or more methods.

14. The computing device of claim 13, wherein the plurality of annotations comprises one or more of:
class-level annotations associated with one or more classes of the set of classes, or
method-level annotations associated with one or more of the methods.

15. The computing device of claim 11, wherein the operations further comprise:
collecting a plurality of test results associated with the first test set and the second test set; and
aggregating the plurality of test results.

16. The computing device of claim 11, wherein the operations further comprise:
determining, using a machine learning model, the plurality of annotations associated with the plurality of test cases; and
automatically adding the plurality of annotations to the plurality of test cases,
wherein the machine learning model is trained on training data that indicates example test topics associated with example test cases.

17. One or more non-transitory computer-readable media storing computer-executable instructions that, when executed by one or more processors, cause the one or more processors to perform operations comprising:
identifying a plurality of test cases associated with a policy management application that interacts with a database and manages policies based on records stored in the database;
identifying a plurality of annotations associated with the plurality of test cases, the plurality of annotations indicating test topics associated with the plurality of test cases;
determining a code change associated with at least one of:
a test case of the plurality of test cases, or
the policy management application;
determining a first annotation, of the plurality of annotations, that indicates a first test topic associated with the code change;
identifying, from among the plurality of test cases, a subset of relevant test cases associated with the first annotation;
identifying a second annotation and a third annotation, of the plurality of annotations, that:
are different from the first annotation associated with the code change, and
indicate additional test topics different from the first test topic;
identifying, in the subset of relevant test cases associated with the first annotation, a first group of related test cases that share the second annotation;
identifying, in the subset of relevant test cases associated with the first annotation, a second group of related test cases that share the third annotation;
distributing the first group of related test cases to a first test set associated with a first parallel thread;
distributing the second group of related test cases to a second test set associated with a second parallel thread; and
executing the first test set and the second test set in parallel.

18. The one or more non-transitory computer-readable media of claim 17, wherein:
the plurality of test cases comprises a set of classes,
individual classes of the set of classes comprise one or more methods, and
the plurality of annotations comprises one or more of:
class-level annotations associated with one or more classes of the set of classes, or
method-level annotations associated with one or more of the methods.

19. The one or more non-transitory computer-readable media of claim 17, wherein the operations further comprise:
determining, using a machine learning model, the plurality of annotations associated with the plurality of test cases; and
automatically adding the plurality of annotations to the plurality of test cases,
wherein the machine learning model is trained on training data that indicates example test topics associated with example test cases.

20. The one or more non-transitory computer-readable media of claim 17, wherein:

the operations further comprise causing display of an annotations tool in a user interface of a programming environment associated with the plurality of test cases, and the annotations tool is configured to:
  present a list of selectable annotations;
  receive a user selection of a particular annotation; and
  associate the particular annotation with at least one test case.

* * * * *